United States Patent [19]

Viertel et al.

[11] 4,364,597
[45] Dec. 21, 1982

[54] SUN VISOR FOR VEHICLES INCLUDING A MIRROR

[75] Inventors: Lothar Viertel, Saarlouis; Klaus-Peter Kaiser, Wermelskirchen, both of Fed. Rep. of Germany

[73] Assignee: Gebr. Happich GmbH, Fed. Rep. of Germany

[21] Appl. No.: 160,681

[22] Filed: Jun. 18, 1980

[30] Foreign Application Priority Data

Aug. 1, 1979 [DE] Fed. Rep. of Germany ... 7921916[U]

[51] Int. Cl.³ ............................................... B60J 3/00
[52] U.S. Cl. .................................. 296/97 H; 362/137
[58] Field of Search ................. 296/97 H, 97 R, 97 B; 362/135, 136, 137, 140, 144, 155

[56] References Cited

U.S. PATENT DOCUMENTS

| 3,598,987 | 8/1971 | Kipping | 362/137 |
| 3,641,334 | 2/1972 | Kipping | 362/137 |
| 4,203,149 | 5/1980 | Viertel et al. | 296/97 H |

FOREIGN PATENT DOCUMENTS 2530111  1/1977  Fed. Rep. of Germany .
2730926  1/1979  Fed. Rep. of Germany ... 296/97 H
2327880  5/1977  France ............................. 296/97 R

*Primary Examiner*—Joseph F. Peters, Jr.
*Assistant Examiner*—Ross Weaver
*Attorney, Agent, or Firm*—Ostrolenk, Faber, Gerb & Soffen

[57] ABSTRACT

The disclosure concerns a sun visor for an automotive mirror having a mirror supported in a recess of the sun visor and the mirror being back lighted. The mirror is supported in a light-transmitting frame that is positioned in the recess, whereby the light behind the mirror is transmitted to illuminate the mirror. A covering over the mirror includes a covering frame and a cover flap hingedly supported on the covering frame and pivotable between positions uncovering and covering the mirror. The hinge is located at the bottom of the covering frame so that the cover flap opens downwardly. A clip connection, or the like, holds the cover flap closed to the covering frame. An operator for the light source switch is positioned to be engaged by the cover flap when the latter is closed for thereby moving the light source between the on and off positions.

10 Claims, 1 Drawing Figure

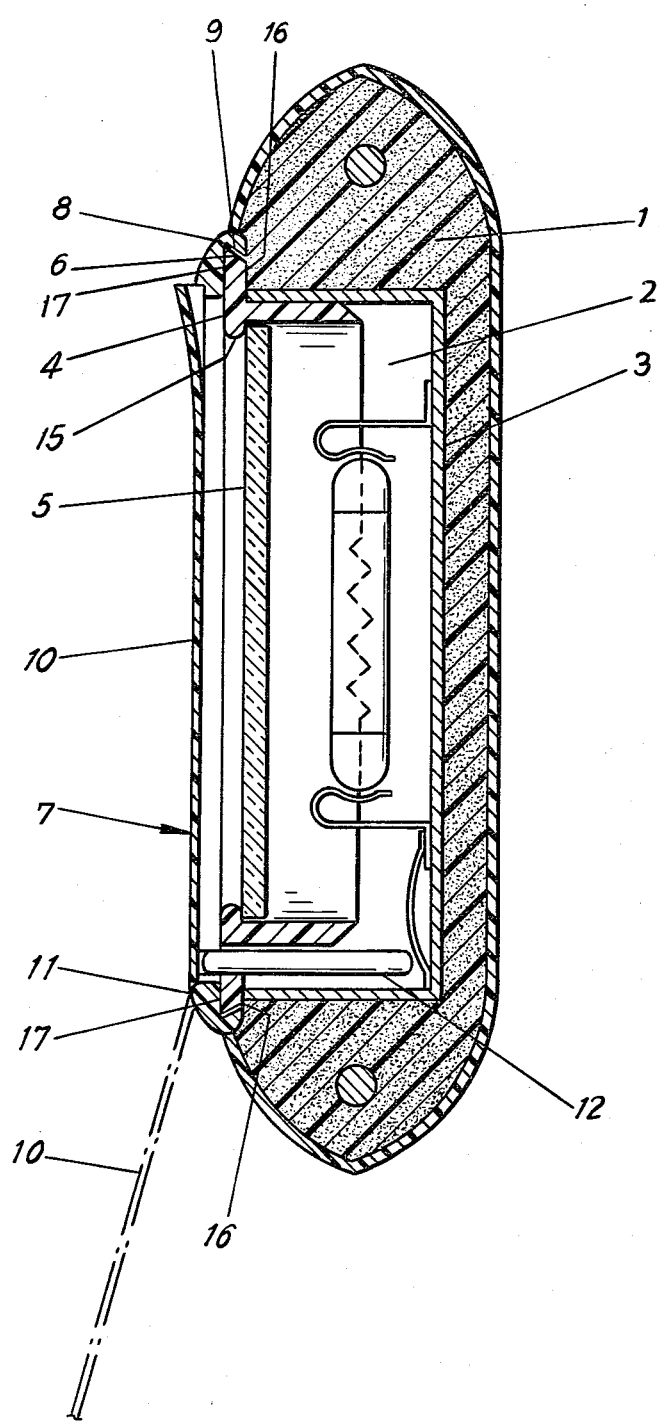

SUN VISOR FOR VEHICLES INCLUDING A MIRROR

BACKGROUND OF THE INVENTION

The present invention relates to a sun visor for automotive vehicles, which sun visor has a mirror in the body of the sun visor, and particularly a mirror seated in a light-transmitting frame which is back-lit by a light.

The cover flap protion of the covering over a mirror in a sun visor may have a frame of its own. This covering frame is connected by a clip with the body of the sun visor or else with the light-transmitting frame of the mirror. As this construction is relatively simple and does not cause difficulties, such a mirror covering can be found today in most cars, particularly higher-price and medium-price cars.

Difficulties are presented by an illiminated sun visor mirror that is surrounded by a luminous frame. The luminous frame is preferable not covered over or is at most only minimally covered. Otherwise, the illumination is too greatly reduced. Furthermore, the attachment of the luminous frame must be simple from a manufacturing standpoint and must be reliable and permanent.

The covering frame nearly always is comprised of an elastic thermoplastic material and preferably has a single-piece development, using the same material. To connect the cover flap of the covering with the covering frame by means of a film hinge that frame must consist of elastic material. Connecting the cover with the light-transmitting frame, which is of hard material and which has optical qualities results in particular problems.

SUMMARY OF THE INVENTION

The object of the invention is to provide a covering for a sun visor mirror that has a luminous frame which covering protects the mirror and the luminous frame against accidents, particularly in the case of fragmenting silicate mirrors.

According to the invention, a covering is provided which grips over the light-transmitting frame. The covering includes a covering frame that includes a cover flap, which is connected to the covering frame by a hinge. The covering generally protects both the mirror and the light-transmitting frame. Reliable protection against accidents is obtained.

The covering is preferably held to the light-transmitting frame in the sun visor body by a clip connection. This is a simple and sufficiently reliable attachment. By the use of such attachment, adhesive material and the corresponding process steps are saved.

The light yield is only insignificantly reduced if the part of the clip connection on the light-transmitting frame is an outer circumscribing surface and the part of the clip connection on the covering is an inner surface. By this development the covered surface of the light-transmitting frame can be made extremely small since the outer circumscribing frame of the covering can be kept narrow since it has great additional stability due to its overlapping around the statically firm light-transmitting frame.

It is even possible to retain the entire light yield if the frame of the covering is also made of light-transmitting material and has a light-impervious cover flap. In this way, the surface of the light-transmitting frame is not covered by light-impervious material so that the full illumination is retained. Illumination may even be enhanced if the light-transmitting covering frame of the cover flap has optical qualities. If the entire covering is comprised of light-transmitting material and with the cover flap being made light-impervious by an applied coating, there is substantial simplification in construction, particularly since the covering frame and the cover flap can be made of one piece and be of the same material.

The one-piece, same-material construction of the covering can be obtained particularly simply if the hinge is a film hinge having tabs which are integrated with the covering frame and the cover flap.

It is also advantageous if the cover flap of the covering can be held in place, and particularly at its position covering the mirror, by a disengageable detent. It is possible to arrange the hinge of the covering at the bottom of the covering frame, whereby a separate hold-open device for the cover flap is not needed. The flap remains in the open position due to its own weight. In this connection, a spring bolt or a clip molding can be associated with the cover flap to serve as the simple and dependably operating detent.

Futhermore, the switch for actuating the source of light is arranged with its switch button or switch slide in the region of the cover flap. The off-position of the switch is secured as the switch button or switch slide rests against the inside of the cover flap in the closed position of the flap.

One embodiment of the invention is shown by way of example in the accompanying drawing, which is a verticle sectional view through a sun visor according to the invention.

DESCRIPTION OF A PREFERRED EMBODIMENT

A sun visor according to the invention includes a visor body 1, which has a large, chamber-shaped recess 2 defined in it. The recess opens toward one of the wide surfaces of the body. A box 3 of rectangular shape in elevation and also having a rectangular cross-section is arranged in the recess. The box 3 is preferably affixed in position upon the manufacture of the sun visor body 1 by foamed plastic material. The box 3 holds the frame 4 in the box by clips, for instance, not shown. The frame 4 is of rectangular shape, viewed in elevation. Its peripheral margin has a T-shaped profile. The arm 15 of the margin of the frame is adapted to receive a mirror 5 in reliable manner and to retain the mirror in place by means of its inner corner. The sun visor body 1 is provided in the region of the resting surface 16 of the frame with a recess so that the frame 4 is of counter-sunk arrangement and the arm 17 of the margin of the frame terminates practically flush with the outside of the sun visor body 1. The frame 4 is a luminous frame. It is comprised of glass-clear or milky colored plastic, and particularly of polyacrylic resin or polycarbonate.

The outer circumscribing edge 6 of the arm 17 of the frame 4 is continously beveled off inwardly of the visor body. The edge 6 defines a surface for a clip connection for the covering 7 and particularly the covering frame 8 of the covering 7. The frame 8 includes the clip surface 9, which is adapted to the edge 6.

The covering 7 includes the covering frame 8 and the cover flap 10. These parts are connected by a film hinge 11. They are all a single integral piece of the same material. The cover flap 10 is therefore a wing-like flap, with a downwardly directed open position (shown in broken lines). In this way, no special holding device is necessary for maintaining the open position of the cover flap 10. The cover flap can be secured in the closed position in various ways. A spring-bolt detent is advisable. (It is not shown as it is so well known.)

In the box 3, behind the mirror 5, a conventional battery operated light source 18 is positioned. It is connected to a conventional power source, either in the visor body or externally thereof. See, e.g. U.S. Pat. No. 4,203,149. Light source 18 back lights the mirror 5.

For actuating the switch contact for the light source 18, there is a push-button switch 12 which is moved to its disconnect position when the cover flap 10 is closed, and which moves into a position in which it closes the electric contacts to the light source when the cover flap 10 is open.

The present invention may be embodied in other specific forms without departing from the spirit or essential attributes thereof and, accordingly, reference should be made to the appended claims, rather than to the foregoing specification, as indicating the scope of the invention.

What is claimed is:

1. A sun visor with an illuminated mirror for an automotive vehicle, or the like, comprising:
    a sun visor body; a recess defined in the visor body and extending in from a large surface side wall thereof; a first light-transmitting frame positioned in the recess; the first light-transmitting frame having a peripheral margin extending substantially parallel to the large surface side wall, the peripheral margin having a first beveled surface around its periphery, the first beveled surface being beveled inwardly of the visor body aroud the entire periphery thereof;
    a mirror supported in the first frame generally at the outside of the recess;
    a light source located behind the mirror in the recess for back lighting the mirror and for providing light to be transmitted by the first frame;
    a covering for covering over the outside of the first frame and the mirror; the covering including a covering frame generally located at the outside of the recess disposed substantially forward of the mirror and extending around the first frame; a second surface of the covering frame being substantially parallel and complementary to the first beveled surface of the peripheral margin of the first frame around the entire periphery thereof, and cooperating with the first beveled surface to form a clip arrangement; the covering frame being clipped over the perphery of the peripheral margin of the first frame by the clip arrangement, the covering further including a cover flap and a hinge for connecting the cover flap to the covering frame at an edge of the cover flap and the hinge enabling the cover flap to pivot between a position covering the outside of the first frame and a position opening to uncover the outside of the first frame.

2. The sun visor of claim 1, wherein the covering frame is comprised of light-transmitting material and the cover flap is comprised of light-impervious material.

3. The sun visor of claim 1, wherein the entire covering is comprised of light-transmitting material, and a light-impervious layer is applied to the cover flap for making the cover flap light-impervious.

4. The sun visor of claim 1, wherein the hinge is positioned at the bottom side of the covering frame, whereby the cover flap pivots open downwardly.

5. The sun visor of claim 4, further comprising holding means for holding the cover flap in a position covering the outside of the first frame.

6. The sun visor of claim 1, wherein the cover flap, hinge and covering frame are an integral, single material assembly.

7. The sun visor of either of claims 1 or 6, wherein the hinge is a film-like hinge extending to the covering frame and the cover flap.

8. The sun visor of claim 7, further comprising holding means for holding the cover flap in a position covering the outside of the first frame.

9. The sun visor of claim 1, further comprising a switch for switching the light source on and off and a switch operator extending out toward the cover flap, such that the cover flap engages the switch operator when the cover flap is closed for operating the switch from one to the other of the on and off conditions.

10. A sun visor with an illuminated mirror for an automotive vehicle, or the like, comprising:
    a sun visor body;
    a recess defined in the visor body and extending in from a large surface side wall thereof;
    a box on the recess, the box having dimensions approximately equal to dimensions of the recess;
    a first light-transmitting material position in the box, the frame having a T-shaped cross section, a first leg of the T-shaped cross section comprising a peripheral margin extending substantially parallel to the large surface side wall, the peripheral margin having a first beveled surface around its periphery, the first beveled surface being beveled inwardly of the visor body around the entire periphery thereof, a second leg of the T-shaped cross section comprising walls extending perpendicular to the peripheral margin, the walls engaging interior surfaces of the box;
    a mirror in the first frame, the walls of the frame contacting a peripheral edge of the mirror around the entire peripheral edge, the peripheral margin of the frame protruding over a peripheral portion of the mirror adjacent the peripheral edge on the side of the mirror outside of the box, the mirror and the frame completely closing the box at approximately the height of the large surface of the side wall;
    a source of illumination located behind the mirror for back lighting the mirror and for providing light to be transmitted by the first frame;
    a covering for covering the outside of the first frame and the mirror; the covering including a covering frame generally located at the outside of the recess and disposed substantially forward of the mirror and extending around the first frame, a second surface of the covering frame being substantially parellel and complementary to the first beveled surface of the peripheral margin of the first frame around the entire periphery thereof, and cooperating with the first beveled surface to form a clip arrangement; the covering frame being clipped over the periphery of the peripheral margin of the first frame by the clip arrangement; the covering further including a cover flap and a hinge for connecting the cover flap to the covering frame at the edge of the cover flap the hinge being disposed on the edge of the covering frame which constitutes the lower edge during use and the hinge enabling the cover flap to pivot between a position covering the outside of the frame and a position opening to uncover the outside of the first frame.

* * * * *